(12) United States Patent
Oddie

(10) Patent No.: US 6,755,978 B2
(45) Date of Patent: Jun. 29, 2004

(54) APPARATUS AND METHOD FOR SEPARATING A FLUID FROM A MIXTURE OF FLUIDS

(75) Inventor: Gary Martin Oddie, St. Neots (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 13 days.

(21) Appl. No.: 10/124,890

(22) Filed: Apr. 18, 2002

(65) Prior Publication Data

US 2002/0153326 A1 Oct. 24, 2002

(30) Foreign Application Priority Data

Apr. 19, 2001 (GB) .............................................. 0109616

(51) Int. Cl.[7] .................................................. C02F 1/40
(52) U.S. Cl. ........................ 210/747; 210/800; 210/170; 210/521; 210/536; 210/540; 166/265
(58) Field of Search ................................ 210/747, 800, 210/170, 521, 522, 532.1, 533, 536, 538, 540; 166/265, 105.4

(56) References Cited

U.S. PATENT DOCUMENTS

| | | | | |
|---|---|---|---|---|
| 1,430,425 A | * | 9/1922 | Widme | 210/533 |
| 4,500,329 A | * | 2/1985 | Campoli et al. | 210/533 |
| 4,816,146 A | * | 3/1989 | Schertler | 210/522 |
| 5,032,273 A | * | 7/1991 | Senyard et al. | 210/521 |
| 5,730,871 A | * | 3/1998 | Kennedy et al. | 210/170 |
| 5,842,520 A | * | 12/1998 | Bolin | |
| 5,857,519 A | * | 1/1999 | Bowlin et al. | |
| 6,033,567 A | * | 3/2000 | Lee et al. | 210/170 |
| 6,082,452 A | * | 7/2000 | Shaw et al. | 166/265 |
| 6,547,005 B2 | * | 4/2003 | Haheim | 166/265 |

FOREIGN PATENT DOCUMENTS

| | | | |
|---|---|---|---|
| GB | 2292574 | * | 2/1996 |
| GB | 2326895 | * | 8/1999 |
| WO | 98/41304 | * | 9/1998 |

OTHER PUBLICATIONS

Schweitzer "Handbook of Separation Techniques for Chemical Engineers" pp 4–129–4–159, 1997.*
Gramme Gravity Separation in Horizontal Wellbores, 2000.*
Miller "Internal Flow Systems", 1978.*
Zukoski "Influence of Viscosity, Surface Tension and Inclination Angle on Motion of Long Bubbles in Closed Tubes", 1966.*

* cited by examiner

Primary Examiner—Christopher Upton
(74) Attorney, Agent, or Firm—William L. Wang; William B. Batzer; John J. Ryberg

(57) ABSTRACT

The invention relates to an apparatus for separation of a first fluid from a mixture of at least the first fluid and a second fluid and a method for doing the same. The apparatus is preferably located downhole, but also can operate on the surface. According to the invention, the apparatus comprises:—a production pipe for flowing the mixture;—at least one settling chamber surrounding the production pipe;—at least one aperture allowing the mixture flowing into the production pipe to flow into the settling chamber; and—an exit pipe, connected to the settling chamber, allowing the first fluid to flow out of the settling chamber.

12 Claims, 4 Drawing Sheets

APPARATUS AND METHOD FOR SEPARATING A FLUID FROM A MIXTURE OF FLUIDS

Figure 1:
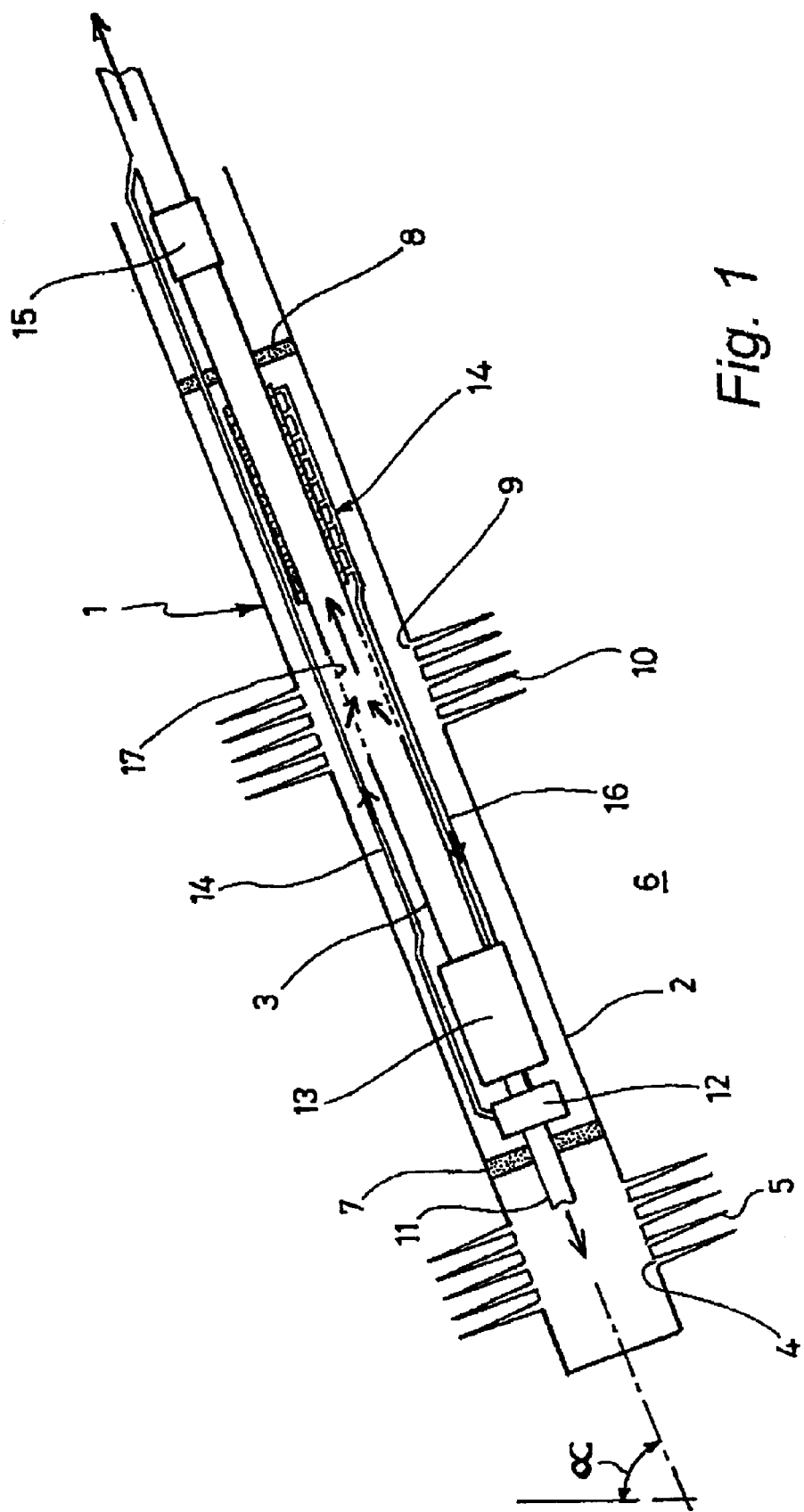

This invention relates to an apparatus and methods for separating a fluid from a mixture of fluids, in particular, down-hole separation of multi-phase fluids produced by an oil well.

BACKGROUND OF THE INVENTION

Many oil wells produce what is basically a mixture of fluids. It is notably a mixture of oil and/or gas together with water, said mixture sometimes carrying mineral particles, especially sand. Somewhere in the oil production system, the fluids of said mixture have to be separated. Then, the oil and/or the gas is or are stored for deliverance to a refinery for further treatment and the water is disposed of, after treatment, at the surface or pumped back into the oil well or another oil well adjacent to the one which it was removed from.

The fluid separation may take place at the surface facilities, the sea bed or down-hole. Separation at the surface is cost effective, especially as water production tends to increase as wells become depleted of oil. In addition, it diminishes the oil and/or gas potential volume to be lifted at the surface per time unit. These are the reasons why down-hole separation is generally preferred, even if remoteness of the separation process from control at the surface, difficulty to carry out down-hole maintenance and the restricted geometry in the down-hole environment constitute sensitive issues that are to be addressed for the implementation of down-hole separation methods.

Several known methods have been proposed for down-hole fluid separation. Amongst these, a number allow fluid separation under the effect of the gravity.

For highly deviated wells, where the deviation is greater than 70° from vertical, the fluid mixture flowing along the pipe is partially stratified and each fluid tends to have a fluid concentration gradient from top to bottom. The known methods using gravity therefore generally propose to achieve separation using carefully designed outlet pipes. For example, in the document published on Aug. 18, 1999 under the number GB 2 326 895, it is proposed to draw the fluids from the flowing mixture using carefully designed outlet pipes. Measurements provided by detectors permit the adjustment of the flow rate through the pipes. In other examples, more complicated manifolds are used. They guarantee the removal of water from the lowest point in the well bore. However, when the deviation of the wells is of about 85 to 90° from vertical, it may be advantageous, as shown in the document published on Sep. 24, 1998 under the number WO 98/41304, to drill oversize a large area of the well bore wherein the residence time of the mixture is increased, leading to an enhanced water separation rate under the effect of gravity.

For lower deviated wells, where the deviation is less than 70°, refined methods further involve placing flat or corrugated parallel plates, themselves parallel to the mixture flow. Due to the presence of said plates, the Reynolds number of the mixture is reduced and new surfaces for coalescence are provided, thus accelerating the separation of water.

The above methods are finally particularly adapted to a specific well geometry, having a specific deviation, and to specific mixture flow rate and flow regime.

SUMMARY OF THE INVENTION

Considering the prior art, one problem that the invention is proposing to solve is to carry out a down-hole apparatus for separation of a fluid from a mixture of fluid, as well as a method for doing the same, said apparatus and method providing fluid separation for all well deviations, whatever be the mixture flow rate and flow regime into the producing pipe.

In a first aspect, the invention concerns an apparatus for separation of a first fluid from a mixture of at least said first fluid and a second fluid, comprising:—a production pipe for flowing the mixture;—a plurality of settling chambers surrounding said production pipe;—for each settling chamber at least one aperture allowing at least part of the mixture flowing in the production pipe to flow into the settling chamber; and—an exit pipe, connected to one or more of the settling chambers, allowing the first fluid to flow out of said settling chambers. The apparatus is preferably designed and arranged to be installed and operated down-hole.

In a second aspect, the invention concerns a method for separation of a first fluid from a mixture of at least said first fluid and a second fluid, comprising the following steps: flowing the mixture through a production pipe; flowing at least part of the mixture through at least one aperture of said production pipe, into a plurality of settling chambers surrounding said production pipe; allowing the first fluid to separate from the mixture under the effect of the gravity in each of said settling chambers; and flowing the first fluid out of the settling chambers. The method is preferably a down-hole separation method and the aforementioned steps are preferably performed down-hole.

The settling chambers are to some extent independent from the producing pipe. Therefore, the flow rate and regime of the mixture circulating into said pipe are also independent from the mixture flow rate and regime into the chamber. In particular, whatever is the flow rate into the producing pipe, the fluid mixture contained in the chamber may almost stagnate so as to allow gravity to separate the fluids.

Also, the separation may take place independently of the pipe deviation.

According to another embodiment, a method and apparatus is provided for separation on the surface. As used herein, the term "surface" in marine applications includes at and above the sea-bed. The structures and features of the described down-hole separator can, in many cases, also be applied to surface separation applications.

DRAWINGS

Figure 2:
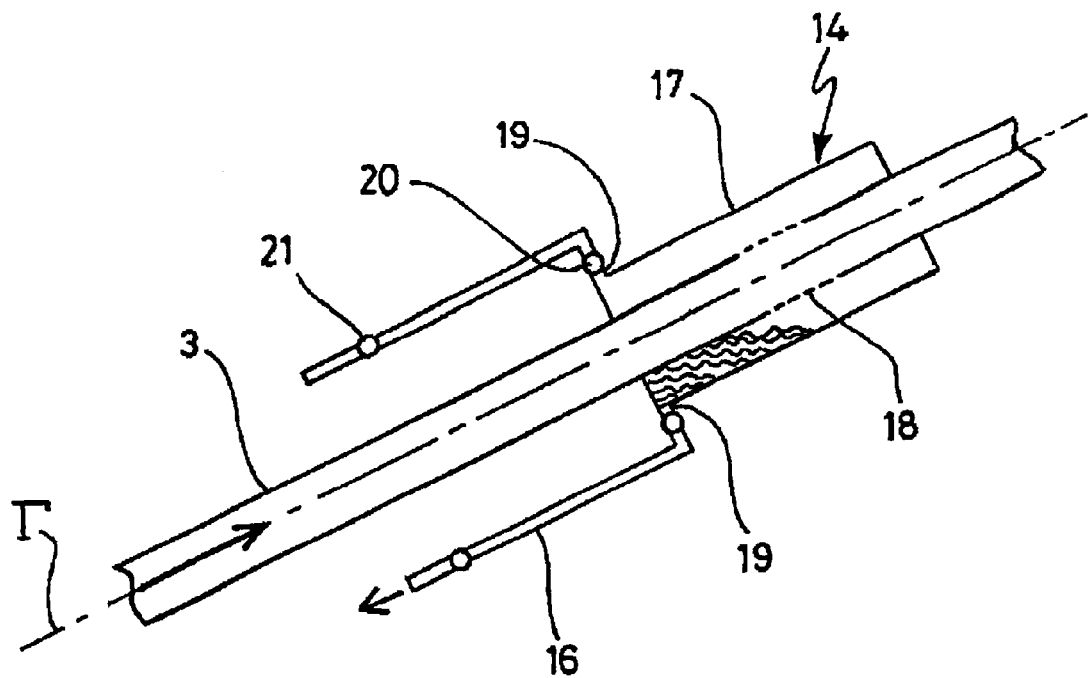
Figure 3:
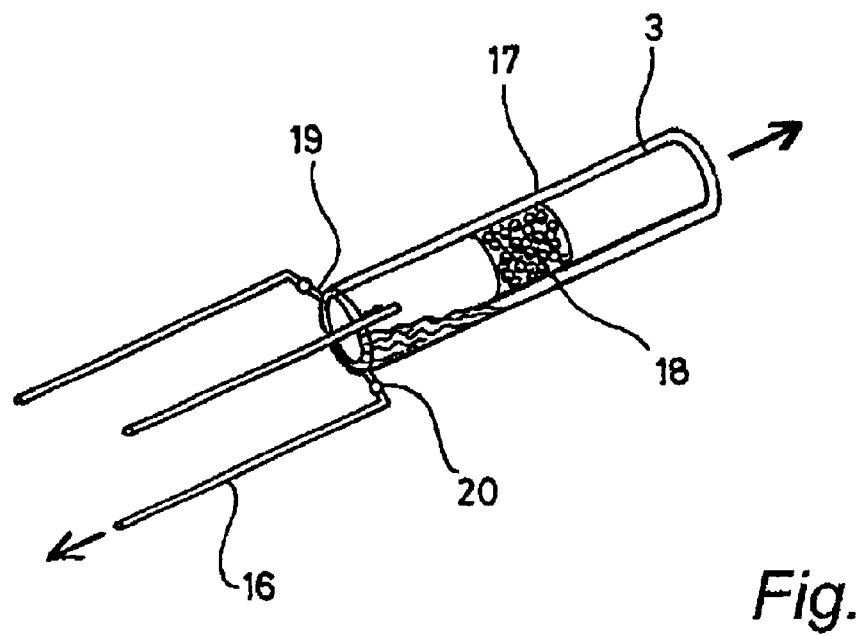
Figure 4:
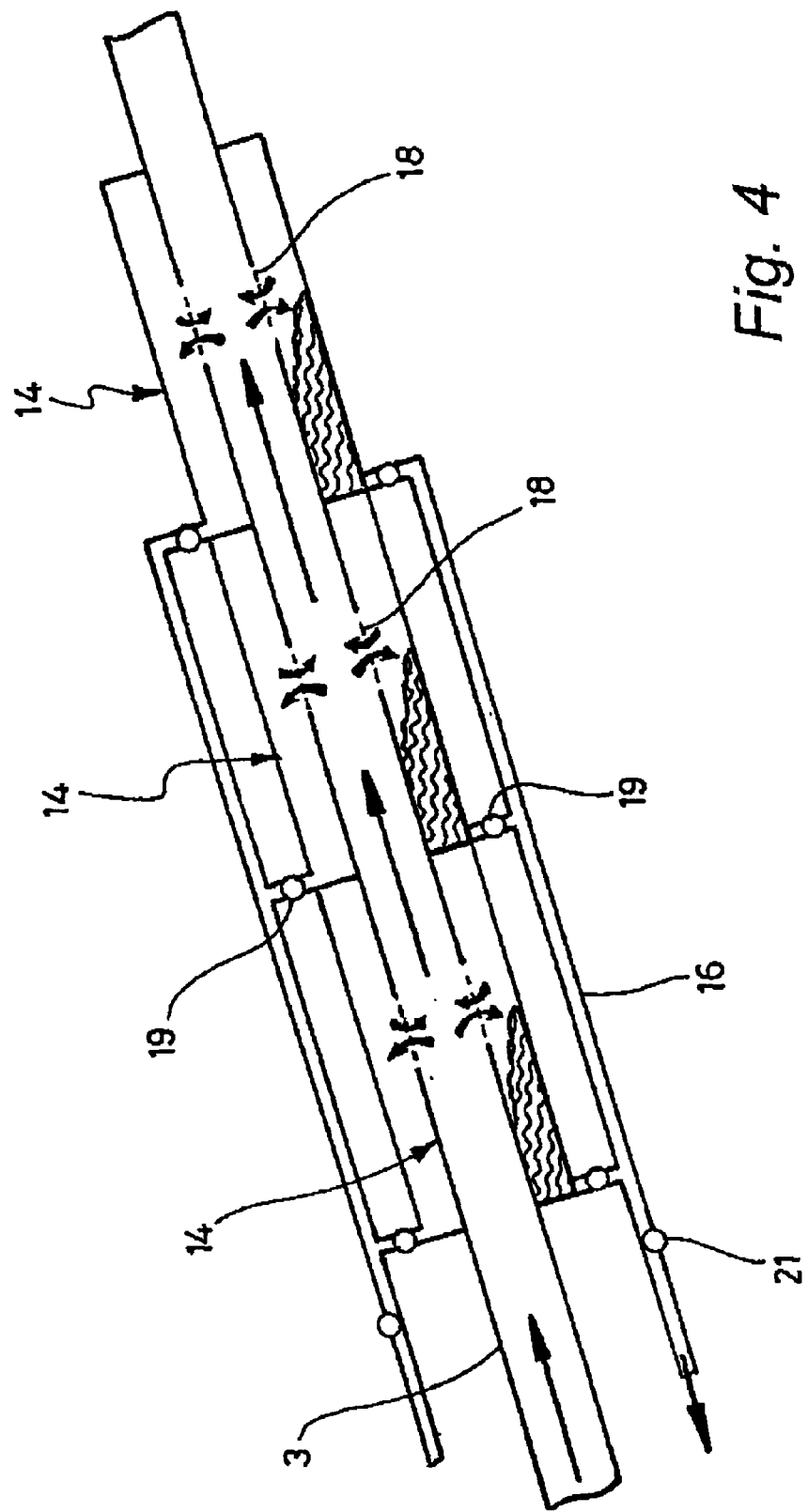
Figure 5:
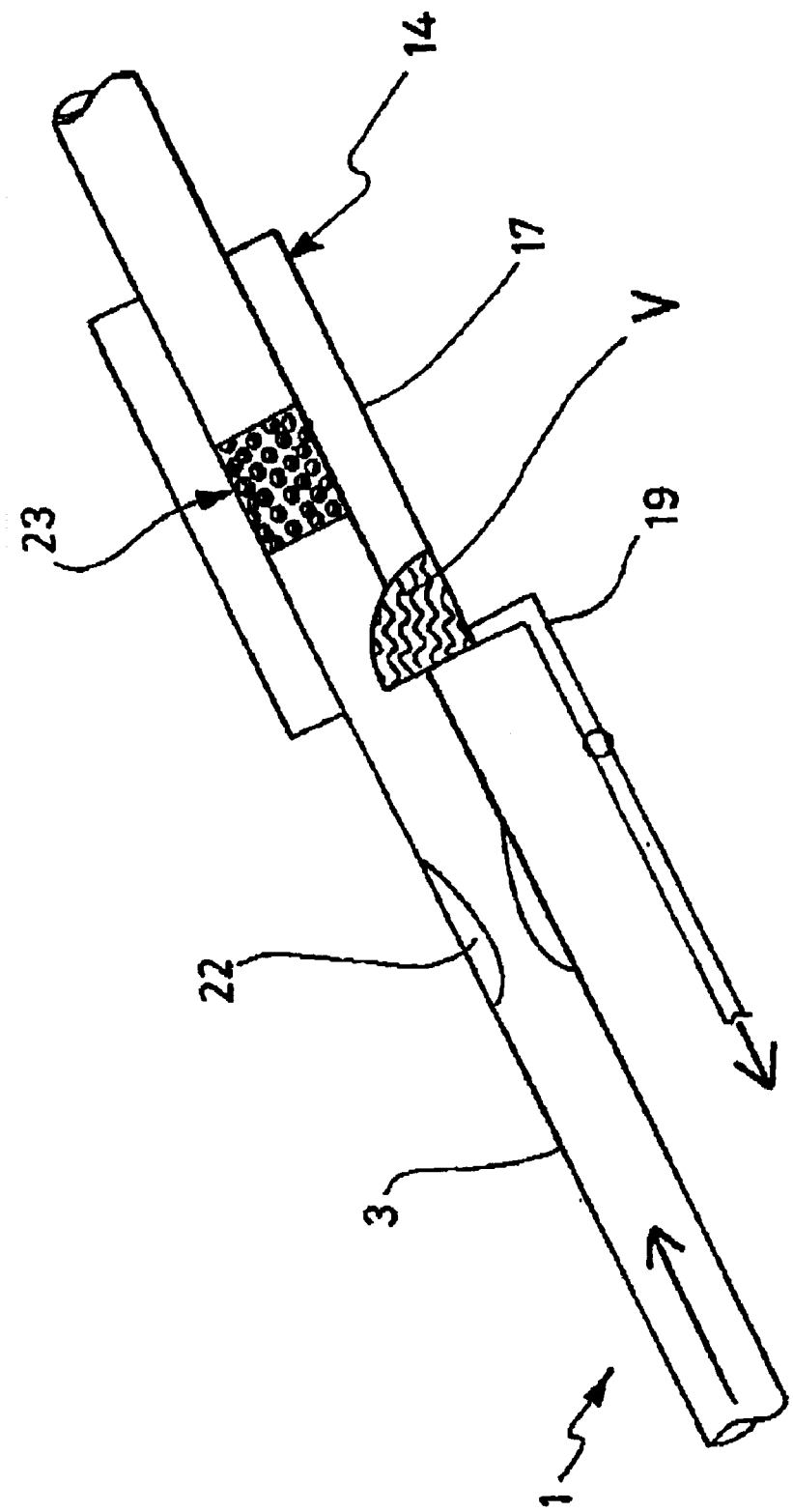

The invention will be better understood in the light of the following description of non-limiting and illustrative embodiments, given with reference to the accompanying drawings, in which:

FIG. 1 shows an apparatus according to the invention;

FIG. 2 schematizes a producing pipe provided with a settling chamber in an apparatus according to the invention;

FIG. 3 is a perspective view of a settling chamber provided with exit pipes of an apparatus according to the invention; and FIG. 4 schematizes a producing pipe provided with three settling chambers in an apparatus according to the invention; and FIG. 5 shows a test apparatus according to the invention.

MODE(S) FOR CARRYING OUT THE INVENTION

FIG. 1 shows a down-hole apparatus 1 in a well bore for separation of a first fluid from a mixture of at least said first fluid and a second fluid. In the example of the figure, the well is deviated of an angle α of about 70° from vertical. It is however understood that the well may be vertical, horizontal or deviated of an angle α, which may be of any value between 0 and 90° from vertical.

The down-hole apparatus according to the invention comprises a production casing 2 and a production pipe 3.

The production casing 2 is a heavy cylindrical steel pipe lining the well bore. It is in general kept in place in said well bore by a cement sheath not shown in the figures. A lower part of the casing 2 comprises re-injecting openings 4, which lead to a re-injecting zone 5 of a formation 6 surrounding the apparatus 1. An intermediate part of the casing 2 is delimitated by a lower 7 and an upper 8 production packers. It comprises production openings 9, which come out into a production zone 10 of the formation 6. An upper part of the casing 2 is located above the upper production packer 8.

The production pipe 3 is enclosed into the casing 2. It is approximately cylindrical and is provided, along its length, with various devices and, notably, starting from its lower part and going to its upper part, with an exit pipe 11, a sand separator 12, a rejecting pump 13, one or a plurality of separator units 14 and an artificial lift device 15. The exit pipe 11 extends over the lower packer 7, unblocks into the lower part of the casing 2 up to the re-injecting zone 5. The sand separator 12 is affixed to the exit pipe 11. It is connected to a sand exit conduit 14, which goes along the production pipe 11 and connects it above the artificial lift device 15. The rejecting pump 13 is connected to the entry of the exit pipe 11 and to the end of a separated fluid conduit 16, said separating conduit 16 being connected to each one of the separator units 14. Between the rejecting pump 13 and the separator units 14, at the production zone level, the production pipe 3 is provided with openings 17.

The apparatus 1 according to the invention comprises one or a plurality of separator units 14, each unit comprising a settling chamber and at least one exit pipe.

As shown on FIGS. 2, 3 and 4, the settling chamber 17 is approximately cylindrical and surrounds the producing pipe 3, in such a way that the main axis Γ of said chamber 17, and the one of the producing pipe, are the same. The wall of the producing pipe 3 is provided with at least one but, preferably, a plurality of small apertures 18.

Each exit pipe 19 is connected to the lower part of the chamber 17. As shown in particular on FIG. 3, there may be three exit pipes 19 which are each connected to the lower part of the chamber 17 at connection points spaced of 120° along the circumference of said chamber 17. Each exit pipe 19 comprises a flow restriction valve 20, which is preferably equipped with a non-return valve. Downstream said restriction valve 20, each exit pipe is connected to the separated fluid conduit 16, which is itself provided with a flow-controlling valve 21.

For example, the thickness of the cylindrical wall of the producing pipe 3 may be about 10 mm. Its internal diameter may be between about 2 inches (50.8 mm) and about 6 inches (152.4 mm). The thickness of the cylindrical wall forming the external surface of the chamber 17 may be about 10 mm as well. Its width, that is to say the difference between its radius and the radius of the pipe 3, may be comprised between about 5 and about 30 mm, for example approximately 15 mm. The apertures 18 may be of any shape and their cross sectional area is between about 30 and about 120 mm. For example, they are circular of 10 mm diameter. Their number is between 1 and around 200. They are included in a particular zone forming an annular section of the pipe 3. That annular section is, for example, of 120 mm height.

The FIG. 4 shows an assembly of three separator units 14. Those three units are superposed along the producing pipe 3. Each exit pipe 19 may be connected to one separated fluid conduit 16 only or to an interconnecting manifold.

The production zone 10 of the formation 6 produces a mixture of immiscible fluids, said mixture comprising at least two different fluids, and carrying eventually some particles, consisting for example of sand. The density of said first fluid is greater than the density of said second fluid. For example, the first fluid is water-based, that is to say comprising essentially water and eventually some other compounds as, in particular, mineral salts, and the second fluid is oil-based, that is to say comprising essentially hydrocarbons. However, any mixture comprising at least two fluids of a different density may be the object of the separation method according to the invention.

As shown in FIG. 1, the mixture of fluids enters the casing 2 through the openings or perforations 9. It further flows into the producing pipe 3 via the openings 17. Once inside said pipe 3, the mixture flows in the direction of the surface. However, at the separator units 14 level, part of the mixture flows into the settling chamber 17, across the apertures 18. Then, the separation occurs. The first fluid, as well as the sand, separated from the mixture, are rejected into the separated fluid conduit 16 and lead down to the rejecting pump 13. That pump 13 pumps the water-based fluid and the sand into the exit pipe 11, to the sand separator 12. Said separator separates the water-based fluid from the sand. Then, the water-based fluid is rejected in the exit pipe 11 into the lower part of the casing 2, down to the lower production packer 7 and gets into the re-injecting zone 5 through the re-injecting openings 4, whereas the sand is pumped through the sand conducting conduit 14 to the upper part of the producing pipe 3 located above the upper production packer 8.

FIGS. 2, 3 and 4 illustrate the separation that occurs in the chamber 17 of a separation unit 14. As shown in those figures, the small apertures 18 around the circumference of the producing pipe 3 allow the mixture to enter into the annular settling chamber 17. When the flow controlling valves 21 are closed, the mixture stagnates in the chamber 17, oil droplets coalesce and, over a period of time, water separates from the mixture under gravity. As a result of the separation process, the lower portion of the chamber 17 fills with the denser fluid of the mixture, that is to say the water-based fluid, whereas the upper part of said chamber fills with the lighter fluid of the mixture, that is to say the oil-based fluid. The area within the chamber 17 annulus close to the apertures 18 receives small fluid fluctuations, depending on the level of mixing of the mixture flowing in the producing pipe 3. However, within the chamber 17, away from said apertures 18, the flow is almost stationary. If the flow restriction valve 20 of the exit pipe 19 of the lower side of the chamber 17 is opened, the water-based fluid flows out and, in particular, when the apparatus is not horizontal, the non-return valve prevents back flow to the settling chamber 17. Then, the mixture, coming from the producing pipe 3, replenishes the settling chamber 17 for further fluid separation. Where sand is carried into the mixture, it fills the lower portion of the chamber 17 and is evacuated by the exit pipe 19. A careful design of said pipe 19 allows the chamber to be back-washed by the water flowing into the conduit 16.

For a given quality of separation, the extraction flow rate depends on the droplet size distribution within the mixture flow, the pipe deviation, the difference of density between the fluids and on factors that determine the rate of coalescence in the annular chamber 17. However, an optimum extraction flow rate may be determined experimentally, by adjusting the flow rate through the exit pipe 19 to the point just before the mixed flow has not had a sufficient residence time in said chamber to separate to a required quality. Then, it is possible to allow flow restriction valves 20 to be preset and an equilibrium flow can be set up to allow continuous separation through the annular zone.

Clearly, a single separating unit 14 provides only a small separated flow. However, placing a plurality of these units along the producing pipe 3 produces a cumulative separation effect. In such case, the separation occurs simultaneously into the plurality of settling chambers, each settling chamber acting in parallel on a small portion of the main flow.

Separation occurring in an apparatus according to the invention, provided with a separating unit 14 comprising only one or two exit pipes 19, is sensitive to its orientation around its central axis Γ. If the apparatus 1 is positioned in such a way that an exit pipe 19 is not placed approximately at the vertical and under said central axis Γ, the separated fluid may not flow into the exit pipe 19. By fixing three or more exit pipes 19 around the circumference of the chamber regularly spaced around the circumference of the chamber, separation occurs, whatever be the position of the apparatus 1 around the axis Γ. There will indeed always be one exit pipe 19 close to the bottom of the chamber 17 to allow the evacuation of the densest separated fluid.

A test apparatus 1 comprising a single separating unit 14 has been constructed. That apparatus 1 is shown in FIG. 5. It comprises a main pipe 3 provided with a Venturi flowmeter 22, which has been placed downstream an ascendant oil/water flow in order to increase the mixing of the water/oil emulsion to be separated. It also comprises a cylindrical chamber 17 surrounding the pipe and an exit pipe 19 connected at the bottom of said chamber. The pipe 3 comprises a zone 23 provided with small apertures 18. As regards to the various dimensions of the apparatus, the diameter of the pipe 3 is equal to 108 mm and the thickness of the wall constituting said pipe 3 is of about 10 mm. The "width" of the chamber 17, as defined above, is equal to 12.2 mm and its length is equal to 600 mm. The length of the zone 23 along the pipe is equal to 120 mm whereas the apertures 18, of which there are 120, are circular of 10 mm diameter. At 3000 barrels/day (bbl/d), i.e. (346.9 m³ per day), wherein the quantity of water is equal to the quantity of oil, which is equal to 1500 bbl/d (173.45 m³/day) the lower part of the annular chamber fills with clear water and the upper part with clear oil. There exists a zone of mixed fluids between the clear water and the clear oil zones in the proximity of the apertures connecting the annular zone with the main flow. As the water flow rate through the exit pipe 19 is increased, the volume corresponding to the clear zone, wherein the water is separated in the annular chamber, is reduced and the volume of the mixed zone is increased. The minimum volume V of the clear zone to guarantee clean separation is sketched in FIG. 5. Noting that only one half of the chamber is active in the separation of the water means that the device could be made half as long and achieve the same separation rate. Thus, although the geometry has not been optimized, a device that measures 300 mm length could remove 15 bbl/d of water from a flowing mixture or emulsion. Experimental observation shows that the exit water and clear zone remain visibly transparent at these flow rates. Stacking the separator units, either built directly into the completion or retrofitted as a specialized piece of tubing at some point in the well allows a cumulative separation effect to be obtained. Thus, a 40' (12.19 m) length device, corresponding to about 40 separator units of 300 mm, could remove 600 bbl/d of water and a device that measures 1000 m in length, corresponding to about 3000 separator units, of 45000 bbl/d.

A six-element device has been constructed with dimensions similar to those described above. The extraction rate of 15 bbl/d per 300 mm length has been confirmed. It is insensitive to the flow regime in the central flow and the deviation of the device from vertical. The separation performance is also insensitive to the water cut in the main flow.

If the quality of the separated flow is not considered adequate for the subsequent processes, then this device could be used as in inlet flow conditioner for other separation processes such as a hydrocyclone, where the combined performance would be greatly improved. In this case, the operating envelope of a hydrocyclone could be considerably increased. The separation process of the present invention may therefore be combined with any other process to improve the performance of the separation.

The connecting pipework or manifold would also be a useful location for adding any chemical treatments to the separated water flow.

The annular chamber relies on a separation process involving droplet coalescence with other droplets and with the walls of the chamber. This process may be further enhanced by the use of materials on the walls or in the body of the annulus that accelerates the coalescence process.

Although the foregoing description has been directed to down-hole application, the structures described in FIGS. 2-4 can also be used in surface applications. On surface applications, some modifications are preferably made. In particular, as the orientation of the device is known, only one set of exit pipes 19 needs to be constructed on the lower side of the separator.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An apparatus for separation of a first fluid of higher density from a mixture of at least said first fluid and a second fluid of lower density, comprising:
    a production pipe for flowing the mixture;
    a plurality of settling chambers adapted to allow gravity to separate the fluids, said chamber surrounding said production pipe;
    for each settling chamber at least one aperture allowing at least part of the mixture flowing in the production pipe to flow into the settling chamber; and
    an exit pipe, connected to one or more of the settling chambers, allowing the first fluid of higher density to flow out of said settling chambers.

2. The apparatus of claim 1, wherein the apparatus is a down-hole separator, and the production pipe, settling chambers, apertures and exit pipe are designed and arranged for downhole installation.

3. The apparatus of claim 1, comprising a plurality of apertures for each settling chamber.

4. The apparatus of claim 1, wherein the cross sectional area of each of the apertures is between about 30 and about 120 mm².

5. The apparatus of claim 1, wherein the exit pipe is connected on the lower side of the settling chambers.

6. The apparatus of claim 1, wherein the exit pipe comprises a flow restriction valve.

7. The apparatus of claim 1, comprising a plurality of exit pipes, each connected to one of the settling chambers.

8. The apparatus of claim 1, wherein the settling chambers are approximately cylindrical and surround the production pipe in such a way that the settling chambers and the production pipe share a common central axis.

9. A method for separation of a first fluid of higher density from a mixture of at least said first fluid and a second fluid of lower density, comprising the following steps:
   (a) flowing the mixture through a production pipe;
   (b) flowing at least part of the mixture through at least one aperture of said production pipe, into a plurality of settling chambers surrounding said production pipe;
   (c) allowing the first fluid to separate from the mixture under the effect of the gravity in each of said settling chambers; and
   (d) flowing the first fluid of higher density out of the settling chambers.

10. The method of claim 9, wherein the method is for down-hole separation, and said steps (a) through (d) are performed down-hole.

11. The method of claim 9, wherein the first fluid is water-based and the second fluid is oil-based.

12. The method of claim 9, wherein each settling chamber acts in parallel on a small portion of the main flow.

\* \* \* \* \*